United States Patent
Terazaki et al.

(10) Patent No.: US 10,136,297 B2
(45) Date of Patent: Nov. 20, 2018

(54) RADIO COMMUNICATION DEVICE, RADIO COMMUNICATION METHOD, COMPUTER-READABLE RECORDING MEDIUM, AND PERIPHERAL WHICH CHANGE A TIME INTERVAL OF LOW POWER COMMUNICATION PROTOCOL DISCOVERY MESSAGES

(71) Applicant: CASIO COMPUTER CO., LTD., Shibuya-ku, Tokyo (JP)

(72) Inventors: Tsutomu Terazaki, Saitama (JP);
Takahiro Tomida, Hamura (JP);
Toshihiro Takahashi, Kunitachi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 22 days.

(21) Appl. No.: 14/559,510

(22) Filed: Dec. 3, 2014

(65) Prior Publication Data

US 2015/0172906 A1 Jun. 18, 2015

(30) Foreign Application Priority Data

Dec. 18, 2013 (JP) .................................. 2013-260778

(51) Int. Cl.
*H04W 8/00* (2009.01)
*H04W 76/10* (2018.01)
*H04W 52/02* (2009.01)

(52) U.S. Cl.
CPC ....... *H04W 8/005* (2013.01); *H04W 52/0216* (2013.01); *H04W 76/10* (2018.02); *Y02D 70/144* (2018.01); *Y02D 70/166* (2018.01)

(58) Field of Classification Search
CPC .. H04W 8/005; H04W 52/0216; H04W 76/02
(Continued)

(56) References Cited

U.S. PATENT DOCUMENTS 7,613,484 B2 * 11/2009 Lappetel inen ... H04W 52/0229
455/343.2
7,804,804 B2  9/2010 Sugaya et al.
(Continued)

FOREIGN PATENT DOCUMENTS

CN     103169448 A    6/2013
EP     2733502 A1     5/2014
(Continued)

OTHER PUBLICATIONS

Extended European Search Report dated Apr. 16, 2015, issued in counterpart European Application No. 14196755.4.
(Continued)

*Primary Examiner* — Vladimir Magloire
*Assistant Examiner* — Donald H B Braswell
(74) *Attorney, Agent, or Firm* — Holtz, Holtz & Volek PC

(57) ABSTRACT

A radio communication device, which performs radio communication with another radio communication device, includes: a radio communication unit configured to send identification information at a predetermined interval and receive a scan request sent by the another radio communication device that has received the identification information; and a control unit configured to change the predetermined interval in the case where the radio communication unit receives the scan request sent by the another radio communication device.

11 Claims, 9 Drawing Sheets

(58) Field of Classification Search
USPC .......................................................... 455/434
See application file for complete search history.

(56) References Cited

U.S. PATENT DOCUMENTS

| | | | |
|---|---|---|---|
| 8,744,345 B2 | 6/2014 | Goto | |
| 9,020,433 B2* | 4/2015 | Linde | H04W 8/005 455/39 |
| 2011/0154084 A1 | 6/2011 | Vandwalle et al. | |
| 2013/0003630 A1* | 1/2013 | Xhafa | H04W 52/0229 370/311 |
| 2013/0003715 A1 | 1/2013 | Xhafa et al. | |
| 2014/0157135 A1* | 6/2014 | Lee | G06F 3/0482 715/738 |
| 2014/0355582 A1* | 12/2014 | Kamath | H04W 84/20 370/338 |
| 2015/0043541 A1* | 2/2015 | Blankenship | H04B 7/2656 370/336 |
| 2015/0172902 A1* | 6/2015 | Kasslin | H04L 45/745 370/328 |

FOREIGN PATENT DOCUMENTS

| | | |
|---|---|---|
| JP | 2006319476 A | 11/2006 |
| JP | 2009027353 A | 2/2009 |
| JP | 2012142877 A | 7/2012 |
| JP | 2012165476 A | 8/2012 |
| WO | 2013003753 A2 | 1/2013 |

OTHER PUBLICATIONS

Japanese Office Action (and English translation thereof) dated Sep. 29, 2015, issued in counterpart Japanese Application No. 2013-260778.

Chinese Office Action (and English translation thereof) dated Oct. 11, 2017, issued in counterpart Chinese Application No. 201410784883.X.

* cited by examiner

RADIO COMMUNICATION DEVICE, RADIO COMMUNICATION METHOD, COMPUTER-READABLE RECORDING MEDIUM, AND PERIPHERAL WHICH CHANGE A TIME INTERVAL OF LOW POWER COMMUNICATION PROTOCOL DISCOVERY MESSAGES

BACKGROUND OF THE INVENTION

The present invention relates to a radio communication device, a radio communication method, a program, and a peripheral.

JP 2012-142877 A, a Japanese patent literature, discloses that a central, which is a radio communication device configured to perform radio communication based on Bluetooth (registered trademark) low energy as a near field radio communication standard, receives identification information called an Advertise periodically sent by a peripheral, which is another radio communication device to communicate with the central, and sends/receives data to/from the peripheral after sending a connection request to the peripheral.

It is thought that, in the above radio communication device, an interval of an Advertise periodically sent by a peripheral is set longer so that power consumption can be reduced during radio communication with another radio communication device. However, since a central, which has received an Advertise, sends a connection request signal after receiving a subsequent Advertise, there is a problem that it takes time until the central connects to a peripheral in the case where an interval of sending an Advertise is set long. On the other hand, in the case where an interval of an Advertise is shortened, there is a problem that power consumed by a peripheral is increased.

An object of the present invention is, in view of the above problems, to provide a radio communication device, a radio communication method, a computer-readable recording medium, and a peripheral, which can change a sending interval of identification information as necessary.

SUMMARY OF THE INVENTION

To achieve the above object, a radio communication device according to a first aspect of the present invention performs radio communication with another radio communication device, and includes: a radio communication unit configured to send identification information at a predetermined interval and receive a scan request sent by the another radio communication device, which has received the identification information; and a control unit configured to change the predetermined interval in the case where the radio communication unit receives the scan request sent by the another radio communication device.

DETAILED DESCRIPTION

An embodiment of the present invention will be described below with reference to the accompanying drawings.

Figure 1:
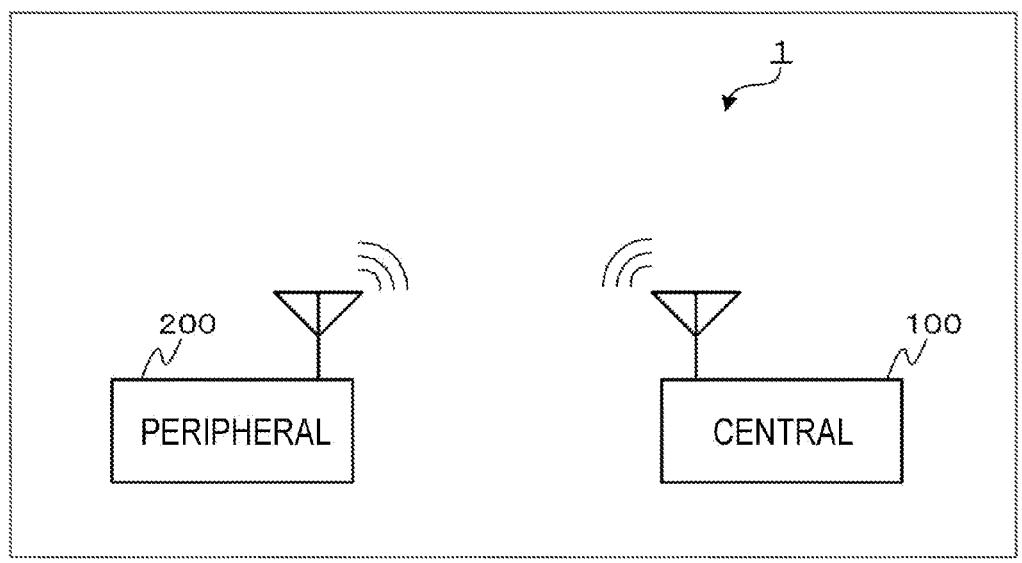
FIG. 1 is a diagram illustrating an exemplary configuration of a radio communication system according to an embodiment of the present invention.

FIG. 1 is a diagram illustrating an exemplary configuration of a radio communication system according to the embodiment of the present invention.

According to the exemplary configuration illustrated in FIG. 1, a radio communication system 1 includes a central 100 and a peripheral 200 as radio communication devices which perform radio communication based on Bluetooth (registered trademark) low energy (hereinafter called BLE). BLE is a standard (mode) which has been developed for the purpose of low power consumption in a near field radio communication standard called Bluetooth (registered trademark). The central 100 is a device, which uses a service (for example, measured data) provided from the peripheral 200. Also, the peripheral 200 is a device configured to provide a service (for example, measured data) to the central 100.

The central 100 is a portable terminal having a radio communication function based on BLE, such as a cell phone, a smartphone, a tablet type personal computer, and a laptop personal computer. In the present embodiment, the central 100 includes a smartphone as an example. The central 100 receives, from the peripheral 200, data obtained by the peripheral 200, displays various information on a display unit 128 to be described later, based on the received data, and makes a sound, such as an alarm, from a speaker 124 to be described later.

The peripheral 200 sends, to the central 100, a notification of an outline of a service owned by the peripheral 200 and an Advertise for accepting a connection request from the central 100.

In radio communication based on BLE, before data sending/receiving between the central 100 and the peripheral 200, the peripheral 200 sends an Advertise, and the central 100 receives the Advertise. An Advertise is identification information, with which a radio communication device notifies another radio communication device of its presence for the purpose of searching for or connecting to another radio communication device.

Also, in radio communication based on BLE, the central 100 receives an Advertise from the peripheral 200 by an operation of a scan. Two types of scan operations are defined as this scan operation; an active scan and a passive scan. In the passive scan, the central 100 just receives an Advertise from the peripheral 200. In the active scan, however, the central 100 also receives a scan response from the peripheral 200 by sending a packet of a scan request to the peripheral 200 when receiving an Advertise from the peripheral 200.

Figure 2:
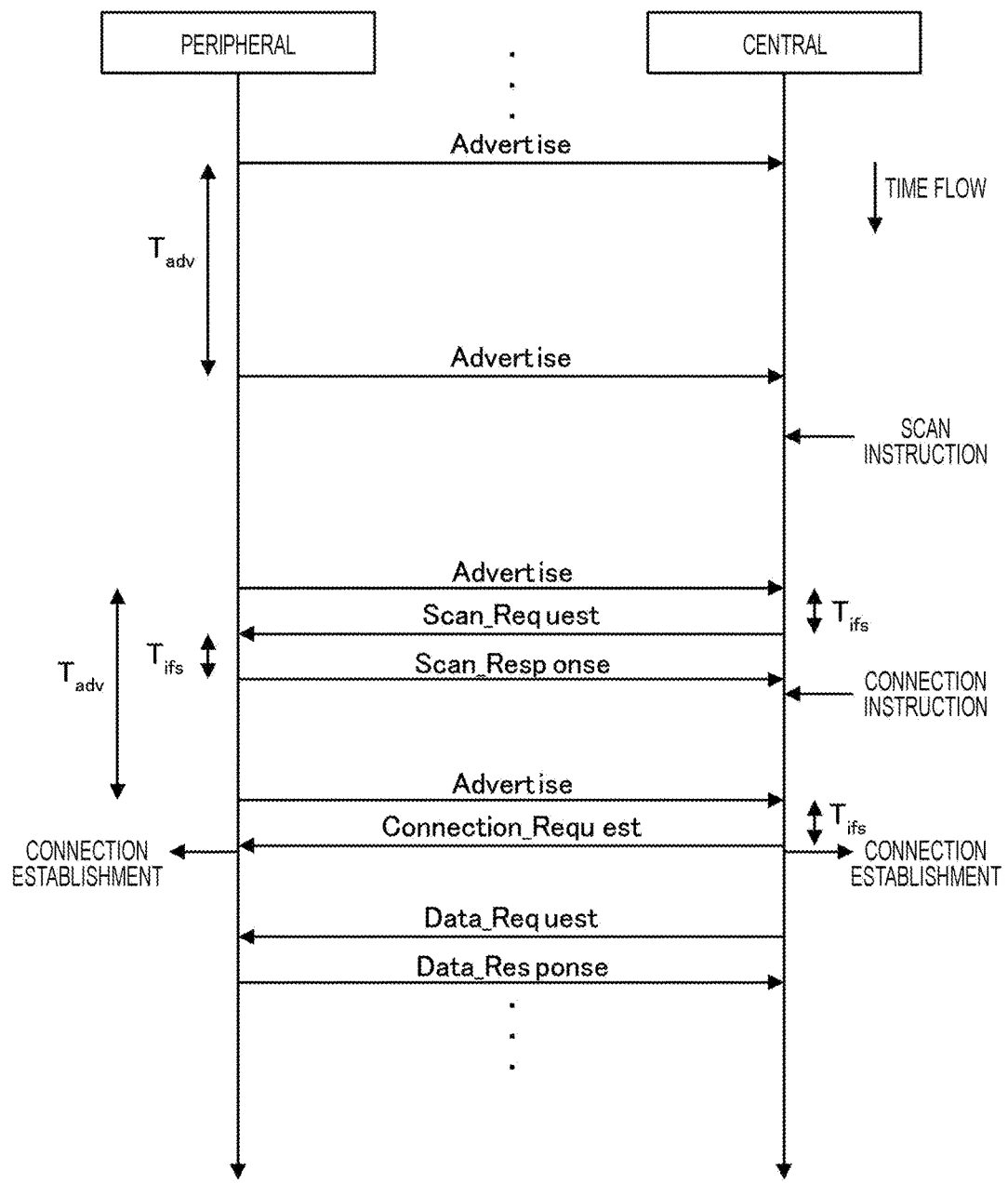
FIG. 2 is a diagram illustrating an example of a flow from advertising between a central and a peripheral, which perform a conventional active scan, until starting data communication therebetween.

FIG. 2 illustrates an example of a conventional flow from advertising between a peripheral and a central, which perform an active scan, until starting data communication therebetween. In FIG. 2, the peripheral sends an Advertise with a period of $T_{adv}$ (for example, approximately 1 to 2 seconds). This period, $T_{adv}$, is set relatively long for power saving. When the central accepts a scan instruction such as by a user operation, the central sends a scan request (Scan_Request) to the peripheral after a lapse of $T_{ifs}$ from receiving a subsequent Advertise. In the case where the central accepts a connection instruction such as by a user operation, the central goes into a standby state for sending a connection request (Connection_Request). On the other hand, after a lapse of $T_{ifs}$ from sending an Advertise, the peripheral goes into a request waiting state on a channel, through which the Advertise has been sent, in order to accept the Scan_Request from the central. The peripheral sends a scan response (Scan_Response) to the central after a lapse of $T_{ifs}$ from receiving the Scan_Request from the central. The central accepts the connection instruction such as by a user operation after receiving the Scan_Response, and then sends the Connection_Request to the peripheral after a lapse of $T_{ifs}$ from receiving a subsequent Advertise. As a result, connection is established between the central and the peripheral. After the connection establishment, on a channel (a channel selected from among 37 channels other than 3 channels used for advertising) determined in the Connection_Request, the central sends a data request (Data_Request) to the peripheral, and the peripheral returns a data response (Data_Response) in response to the Data_Request. Accordingly, data communication is performed between the central and the peripheral.

As described above, in the flow from advertising between the central and the peripheral, which perform a conventional active scan, until starting data communication, a timing at which the central can send a Connection_Request to the peripheral is dependent on a timing at which the peripheral has sent an Advertise. Specifically, in the case where $T_{adv}$, which is an advertising interval, is long, it takes time to establish connection.

In the present embodiment, as compared to this conventional flow, the time to establish connection is shortened by shortening an advertising interval in response to the fact that the peripheral 200 has received a Scan_Request from the central 100.

Next, a hardware configuration of the radio communication system 1 according to the present embodiment will be described.

Figure 3:
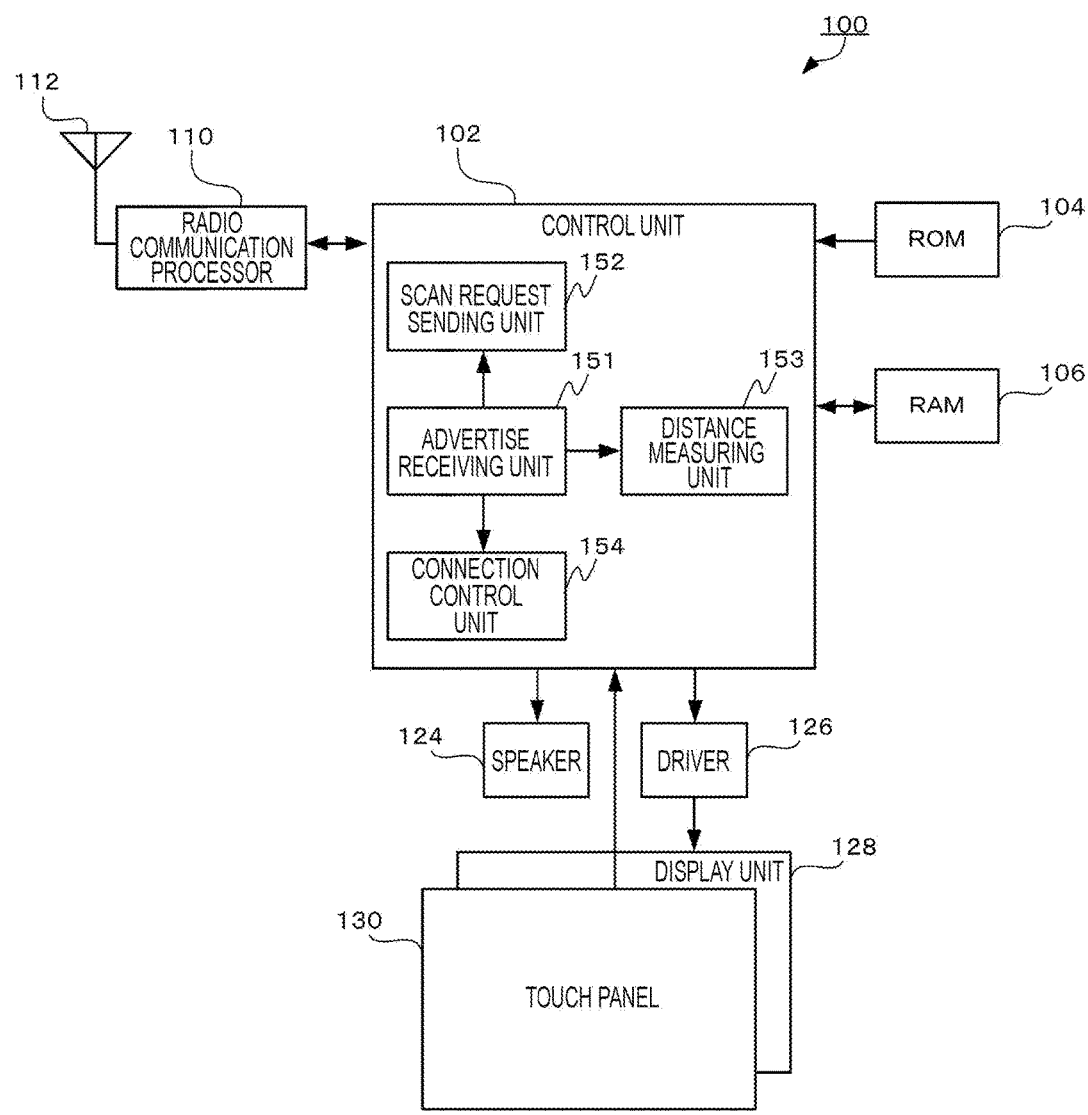
FIG. 3 is a diagram illustrating an exemplary configuration of a central according to the embodiment of the present invention.

FIG. 3 is a block diagram schematically illustrating an exemplary configuration of the central 100 according to the present embodiment. As illustrated in FIG. 3, the central 100 includes a control unit 102, a read only memory (ROM) 104, a random access memory (RAM) 106, a radio communication processor 110, an antenna 112, a speaker 124, a driver 126, a display unit 128, and a touch panel 130.

The control unit 102 includes, for example, a central processing unit (CPU). The control unit 102 controls various functions included in the central 100, by performing software processing in accordance with a program stored in the ROM 104 (for example, a program for realizing an operation of the central 100 illustrated in FIG. 7 to be described later). In the present embodiment, the central 100 implements a distance measuring application for measuring a distance between the central 100 and the peripheral 200 based on the radio field intensity of an Advertise received from the peripheral 200.

The ROM 104 includes a non-volatile memory such as a flash memory, and stores a program and data for the control unit 102 to control various functions, as described above. The RAM 106 includes a volatile memory, and is used as a work area for temporarily storing data so that the control unit 102 performs various processes.

The radio communication processor 110 includes, for example, a radio frequency (RF) circuit and a baseband (BB) circuit. The radio communication processor 110 sends/receives a radio signal based on BLE through the antenna 112.

The speaker 124 outputs a sound such as an alarm based on sound data from the control unit 102. The driver 126 outputs, to the display unit 128, an image signal based on image data output from the control unit 102. The display unit 128 includes, for example, a liquid crystal display (LCD) and an electroluminescence (EL) display. The display unit 128 displays an image in accordance with an image signal output from the driver 126.

The touch panel 130 is arranged on an upper surface of the display unit 128, and is an interface used for inputting a user operation content. The touch panel 130, for example, incorporates a transparent electrode which is not illustrated, detects a position where voltage has varied such as by touch of user's finger, as a contact position, and outputs the contact position information to the control unit 102 as an input instruction.

Next, a functional configuration of the control unit 102 of the central 100 will be described. As illustrated in FIG. 3, the control unit 102 functions as an advertise receiving unit 151, a scan request sending unit 152, a distance measuring unit 153, and a connection control unit 154.

The advertise receiving unit 151 corresponds to an identification information receiving unit. For example, the advertise receiving unit 151 accepts, as a scan instruction of the peripheral 200, a user operation on the touch panel 130 to start communication after starting up an application for communication with the peripheral 200. When the advertise receiving unit 151 accepts the scan instruction, it goes into a standby state for waiting for an Advertise from the peripheral 200. Then, the advertise receiving unit 151 receives an Advertise from the peripheral 200. The scan instruction is not necessarily generated by a user operation, and may be generated, for example, based on a lapse of a timer time set in advance after startup of the application.

The scan request sending unit 152 sends a Scan_Request to the peripheral 200 after a lapse of $T_{ifs}$ after the advertise receiving unit 151 has received an Advertise from the peripheral 200.

The distance measuring unit 153 measures a distance between the central 100 and the peripheral 200 based on the field intensity of a radio wave received from the peripheral 200, in the case where the distance measuring unit 153 receives a Scan_Response from the peripheral 200 with respect to the Scan_Request sent from the scan request sending unit 152.

The connection control unit 154 sends a Connection_Request to the peripheral 200 in the case where the connection control unit 154 has received an Advertise from the peripheral 200 after receiving the Scan_Response from the peripheral 200. Then, the connection control unit 154 establishes connection between the connection control unit 154 and the peripheral 200, and performs data communication with the peripheral 200 as necessary.

Figure 4:
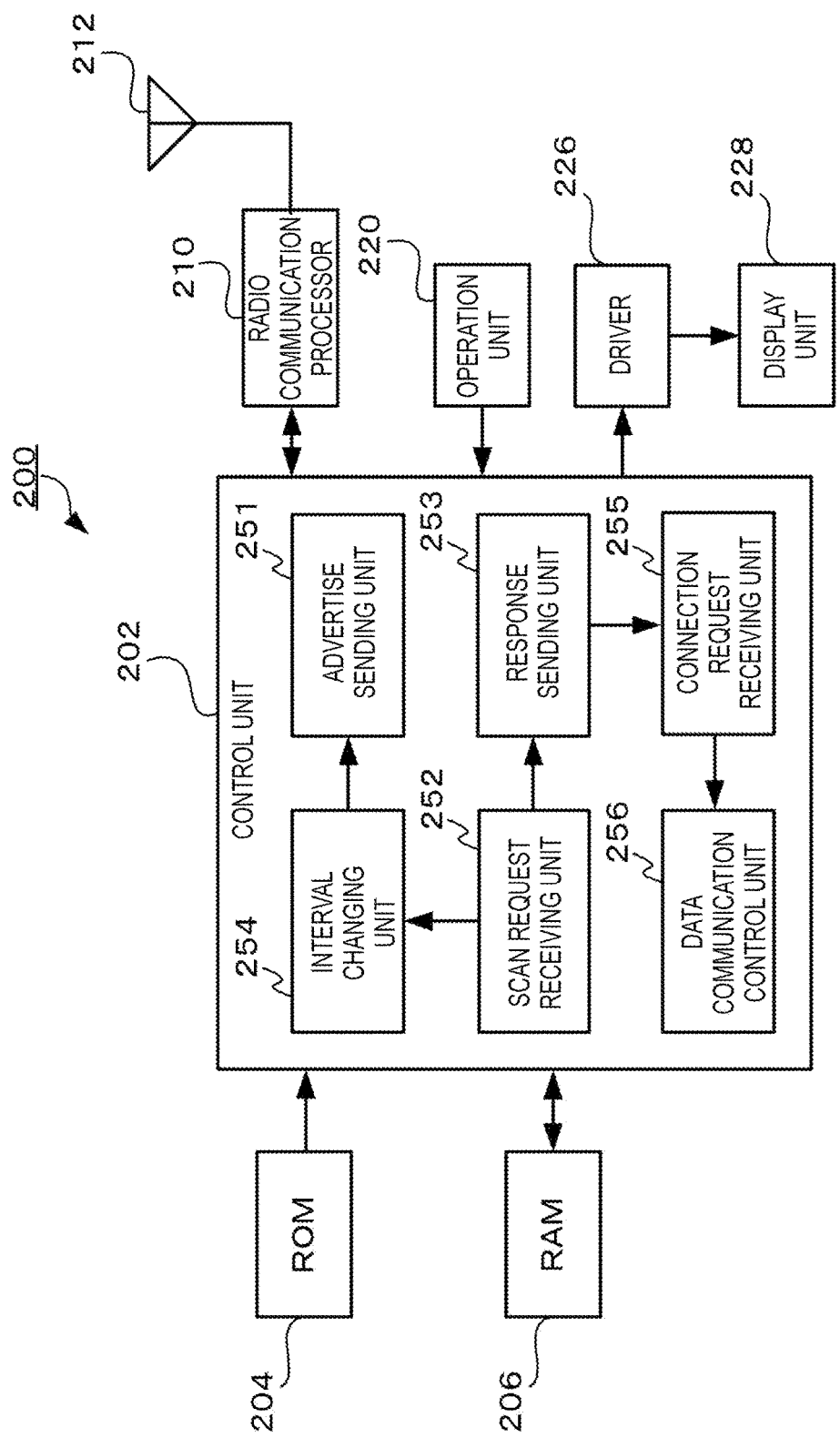
FIG. 4 is a diagram illustrating an exemplary configuration of a peripheral according to the embodiment of the present invention.

FIG. 4 is a block diagram schematically illustrating an exemplary configuration of the peripheral 200 according to the present embodiment. As illustrated in FIG. 4, the peripheral 200 includes a control unit 202, the ROM 204, the RAM 206, a radio communication processor 210, an antenna 212, an operation unit 220, a driver 226, and a display unit 228.

The control unit 202 includes, for example, a CPU. The control unit 202 controls various functions included in the peripheral 200 by performing software processing in accordance with a program stored in the ROM 204 (for example, a program for realizing an operation of the peripheral 200 illustrated in FIG. 8 to be described later).

The ROM 204 includes a non-volatile memory, such as a flash memory, and stores a program and data for the control unit 202 to control various functions, as described above. The RAM 206 includes a volatile memory, and is used as a work area for temporarily storing data so that the control unit 202 performs various processes.

The radio communication processor 210 includes, for example, a radio frequency (RF) circuit and a baseband (BB) circuit. The radio communication processor 210 sends/receives a radio signal based on BLE through the antenna 212.

The operation unit 220 includes, for example, a switch, and is used for inputting a user operation content such as power on/off.

The driver 226 outputs, to the display unit 228, an image signal based on image data output from the control unit 202. The display unit 228 includes, for example, an LCD and an EL display. The display unit 228 displays an image in accordance with an image signal output from the driver 226.

Next, a functional configuration of the control unit 202 of the peripheral 200 will be described. As illustrated in FIG. 4, the control unit 202 functions as an advertise sending unit 251, a scan request receiving unit 252, a response sending unit 253, an interval changing unit 254, a connection request receiving unit 255, and a data communication control unit 256.

The advertise sending unit 251 corresponds to an identification information sending unit, and sends a predetermined type of Advertise to the central 100 at a predetermined interval. The predetermined interval is herein changed by the interval changing unit 254. Also, the advertise sending unit 251 changes a type of the sending Advertise depending on whether being connected to the central 100.

A type of an Advertise sent from the advertise sending unit 251 will be described herein. An Advertise in radio communication based on BLE is classified into four types; "ADV_IND", "ADV_DIRECT_IND", "ADV_NONCONN_IND", and "ADV_SCAN_IND. Among these, in the present embodiment, the advertise sending unit 251 sends, to the central 100, an Advertise classified into either "ADV_SCAN_IND" or "ADV_DIRECT_IND".

"ADV_SCAN_IND" is a type showing that Advertises are sent to an unspecified number of centrals 100, and any of the centrals 100 can send a Scan_Request to the peripheral 200, which has sent the Advertises. The peripheral 200 communicates its presence by notifying the unspecified number of centrals 100 of information including individual ID of the peripheral 200, and also sends Advertises of "ADV_SCAN_IND" when accepting (responding to) Scan_Requests, if any, from the centrals 100. "ADV_SCAN_IND" is set so that the peripheral 200 cannot accept (respond to) a Connection_Request, if any, from the central 100.

"ADV_DIRECT_IND" is a type showing that an Advertise is sent to a specified central 100, and the specified central 100 can send a Connection_Request to the peripheral 200, which has sent the Advertise. The peripheral 200 communicates its presence by notifying a specified central 100, which has been connected before, of information including individual ID of the peripheral 200, and also sends an Advertise of "ADV_DIRECT_IND" when accepting (responding to) a Connection_Request, if any, from the central 100. By using an Advertise of "ADV_DIRECT_IND", a high speed connection to a specified central 100, which has been connected before, becomes possible. "ADV_DIRECT_IND" is set so that, even if a Scan_Request is sent from the central 100, the peripheral 200 does not accept (respond to) it.

The scan request receiving unit 252 goes into a standby state for waiting for a Scan_Request from the central 100 during time $T_{ifs}$ after the advertise sending unit 251 has sent an Advertise. Then, the scan request receiving unit 252 receives a Scan Request from the central 100.

In the case where the scan request receiving unit 252 receives a Scan_Request from the central 100, the response sending unit 253 sends a Scan_Response to the Scan_Request to the central 100.

In the case where the scan request receiving unit 252 receives a Scan_Request sent from the central 100, the interval changing unit 254 changes an interval of an Advertise sent by the advertise sending unit 251. More specifically, in the case where the present interval is a first predetermined interval (for example, 1 to 2 seconds), the interval changing unit 254 changes the interval to a second predetermined interval (for example, tens to hundreds of milliseconds) which is shorter than the first predetermined interval. Also, the interval changing unit 254 returns an advertising interval from the second predetermined interval to the first predetermined interval, after a lapse of a predetermined time (for example, 30 seconds to 1 minute) after changing from the first predetermined interval to the second predetermined interval.

The connection request receiving unit 255 receives a Connection_Request sent by the central 100, which has received an Advertise sent by the advertise sending unit 251 after receipt of a Scan_Response sent from the response sending unit 253.

The data communication control unit 256 establishes connection with the central 100, and performs data communication with the central 100, in the case where the connection request receiving unit 255 receives a Connection_Request from the central 100.

Figure 5:
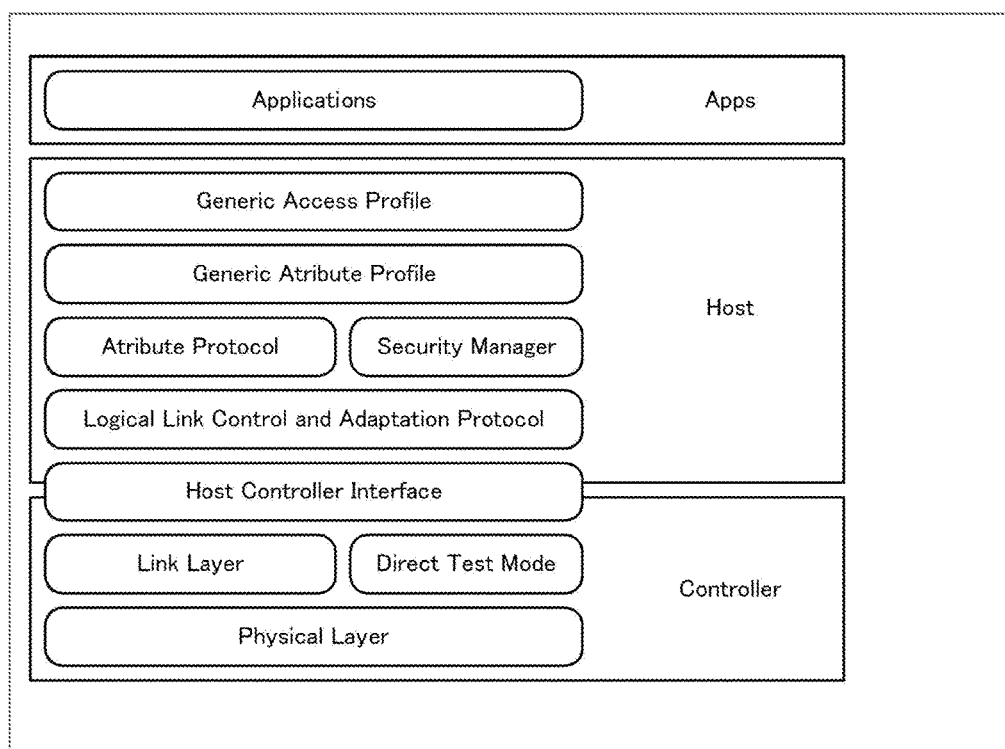
FIG. 5 is a diagram illustrating an example of a protocol stack arrangement in a peripheral, based on Bluetooth (registered trademark) low energy.

Next, a protocol hierarchy for realizing functions of the above control unit 202 will be described. FIG. 5 illustrates an example of a protocol stack configuration of BLE in the peripheral 200. In the protocol stack illustrated in FIG. 5, a Link Layer manages an Advertise and a scan state. Also, the Link Layer takes a role in basic state management such as of a standby state, connection start, and a connection state, and synchronization management of communication. A Host Controller Interface (HCI) is arranged between the Link Layer and a Host. The Host will be notified, through the HCI, of a part of operation information of a Controller, which defines an interface directly controlling the Controller including a Physical Layer and the Link Layer. The Host having received the notification can instruct a corresponding operation of the Controller according to a setting from, for example, Applications.

In a conventional BLE specification, a Link Layer, which has received a Scan_Request from a central, does not have a defined method for notifying of receipt, and is supposed to automatically return Scan Response Data, which has been set in advance by the Host.

As compared to this conventional method, the peripheral 200 according to the present embodiment has a defined method with which the Link Layer, which has received a Scan_Request, notifies the Host of receipt of the Scan_Request. The Host, as necessary, instructs the Link Layer to change an advertising interval from the first predetermined interval to the second predetermined interval, when receiving a Scan Request Report from the Link Layer for notifying of receipt of the Scan_Request. It is preferred that Generic Access Profile (GAP), which takes a role in a basic link management for searching for and connecting to the other side to be connected, herein handle a Scan Request Report from the Link Layer. Also, the Host instructs the Link Layer to return an advertising interval from the second predetermined interval to the first predetermined interval after a lapse of a predetermined time since the advertising interval has been changed in response to receipt of a Scan_Request from the Link Layer.

The Host, which has received a Scan_Request, may not instruct the Link Layer to change an advertising interval. Alternatively, the Host may prepare an HCI command, which is for setting an operation when the Host receives a Scan_Request from the Link Layer in advance; specifically, an advertising interval value (a second predetermined interval), to which the interval is changed in response to the Scan_Request, and a predetermined time to return to the original advertising interval (a first predetermined interval) from the change.

Next, an operation of the radio communication system 1 according to the present embodiment will be described with reference to the flowchart of FIG. 6.

Figure 6:
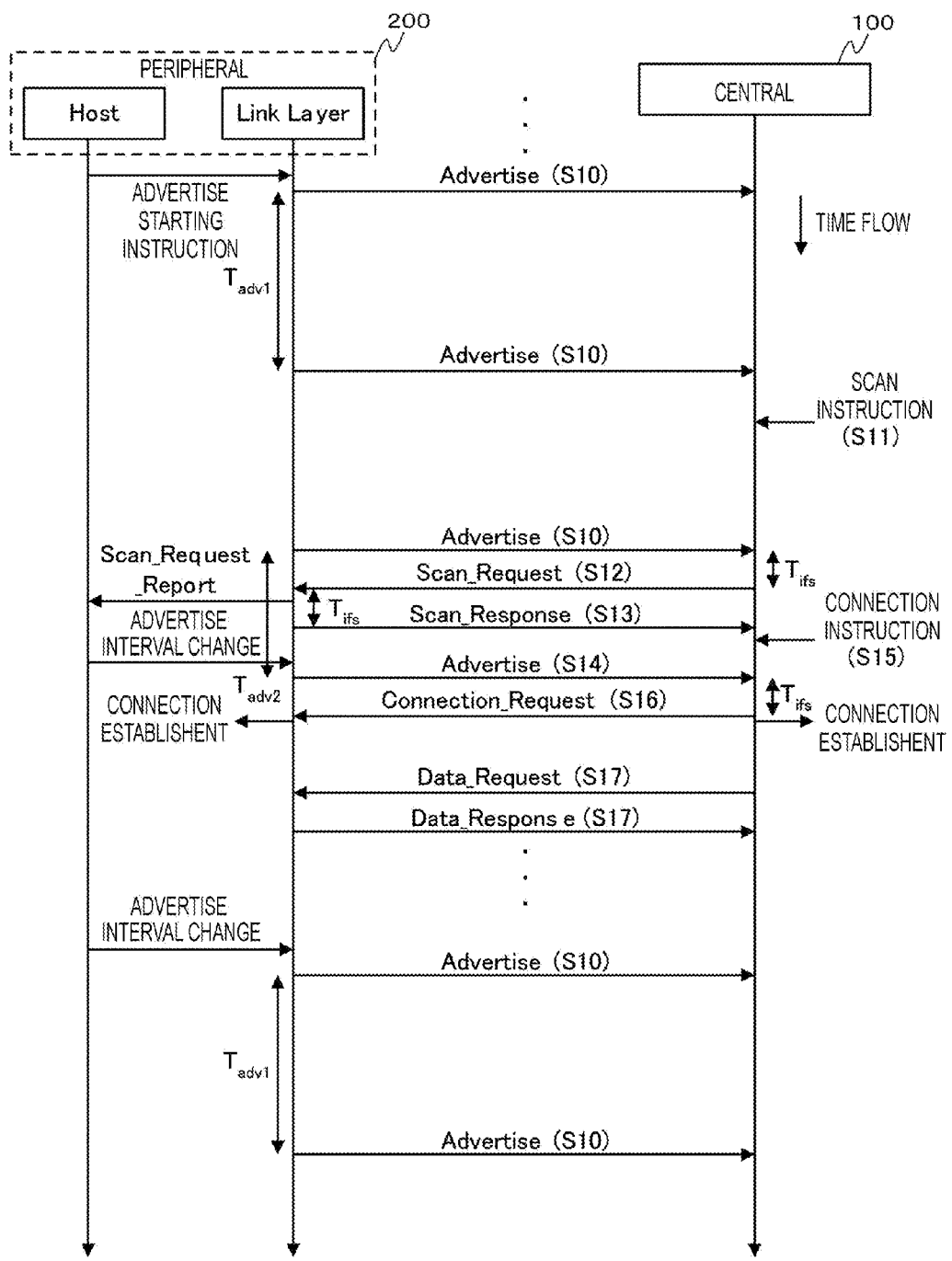
FIG. 6 is a diagram illustrating an example of a flow from advertising between the central and the peripheral according to the embodiment of the present invention until starting data communication therebetween.

FIG. 6 illustrates an example of a flow from advertising between the central 100 and the peripheral 200 according to the embodiment of the present invention until starting data communication therebetween. As illustrated in FIG. 6, in the peripheral 200, when the Host instructs the Link Layer to start advertising, the Link Layer periodically sends an Advertise of "ADV_SCAN_ID" to the central 100 at a first predetermined interval, $T_{adv1}$ (Step S10).

The central 100 accepts, for example, an operation on the touch panel 130 by a user as a scan instruction (Step S11). After step S11, the central 100 scans an Advertise and receives an Advertise sent from the peripheral 200. Upon receiving the Advertise, the central 100 sends a scan request (Scan_Request) to the peripheral 200 after a lapse of time $T_{ifs}$ from the receipt (Step S12).

Then, when the peripheral 200 has received a Scan_Request sent from the central 100 in step S12, the Link Layer sends a scan request report (Scan_Request_Report) for notifying the Host of the receipt of the Scan_Request, and also sends a scan response (Scan_Response) to the central 100 after a lapse of time $T_{ifs}$ from the receipt of the Scan_Request (Step S13). Information on the second predetermined interval $T_{adv2}$ is included in this Scan_Response. As a result, the central 100 can receive in line with a receiving interval before sending a Scan_Request_Report and an interval for sending an Advertise, which is changed by the peripheral 200.

In the peripheral 200, the Host, which has received the Scan_Request_Report, instructs the Link Layer to change an advertising interval from the first predetermined interval $T_{adv1}$ to the second predetermined interval $T_{adv2}$, which is shorter than $T_{adv1}$, and the Link Layer sends an Advertise based on the instruction (Step S14).

Also, the central 100 accepts a connection instruction after receipt of a Scan_Response from the peripheral 200 (Step S15), scans an Advertise, and receives an Advertise sent from the peripheral 200 in Step S14. The central 100 receives the Advertise, and sends a connection request (Connection_Request) to the peripheral 200 after a lapse of time $T_{ifs}$ from the receipt of the Advertise (Step S16).

Afterward, connection is established between the central 100 and the peripheral 200, and data is sent/received therebetween by sending a data request (Data_Request) from the central 100 to the peripheral 200 and sending a data response (Data_Response) from the peripheral 200 to the central 100 (Step S17).

After sending/receiving data between the central 100 and the peripheral 200 has been completed, a disconnect request is sent from the central 100 to the peripheral 200, and by sending a disconnect response from the peripheral 200, which has received the disconnect request, to the central 100, connection between the central 100 and the peripheral 200 ends.

Also, in the peripheral 200, after a lapse of a predetermined time after an advertising interval has been changed to the second predetermined interval $T_{adv2}$, the Host instructs the Link Layer to change an advertising interval from the second predetermined interval $T_{adv2}$ to the former first predetermined interval $T_{adv1}$, and a link returns to a process of step S10 based on the instruction, and restarts sending an Advertise at the first predetermined interval $T_{adv1}$.

Figure 7:
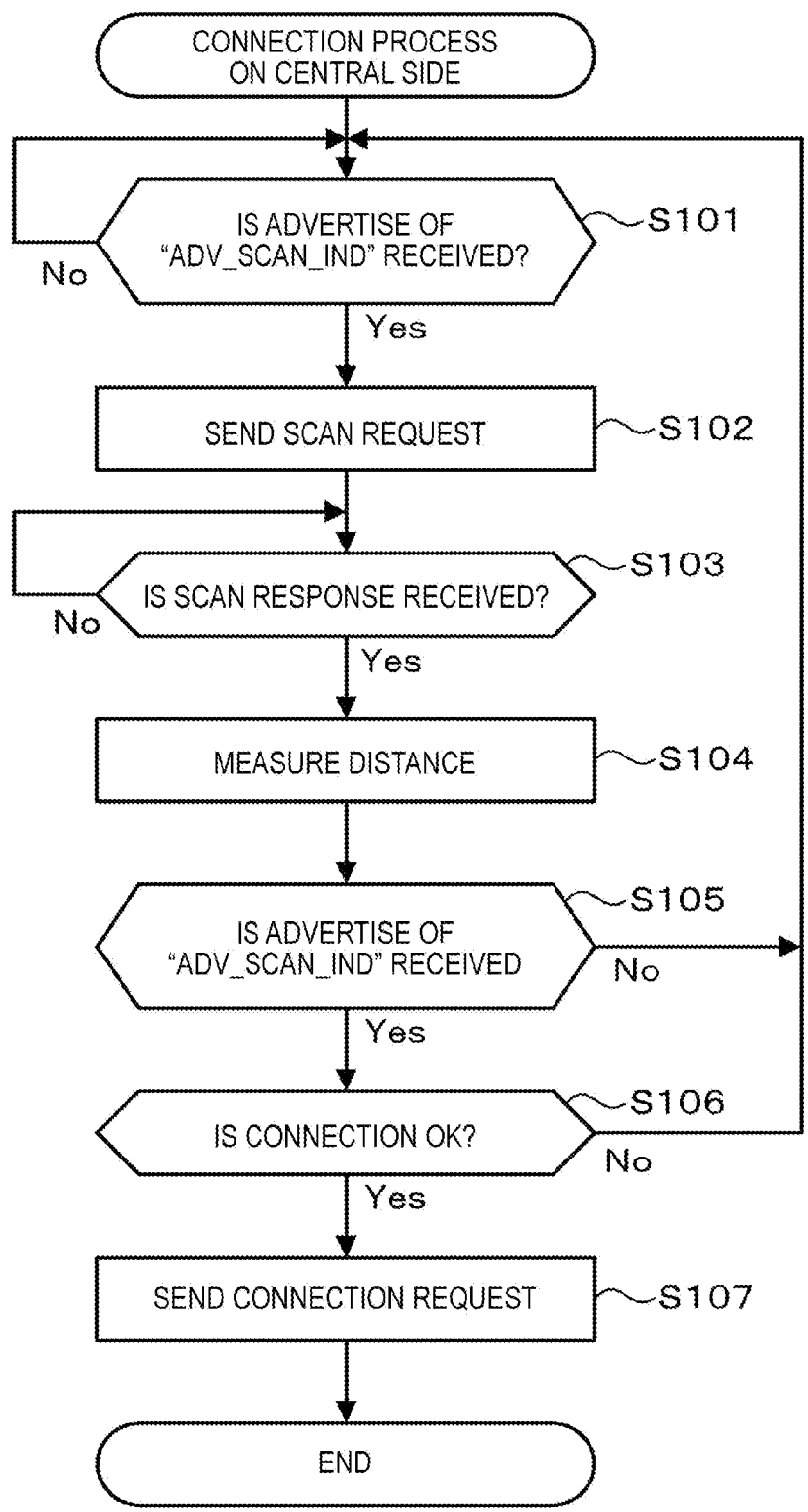
FIG. 7 is a flowchart illustrating an example of a connection process on a central side, which is performed by the central.

Next, an operation of the central 100 according to the present embodiment will be described with reference to FIG. 7. FIG. 7 is a flowchart illustrating an example of a connection process on a central side performed by the control unit 102 of the central 100 according to the present embodiment. This communication process is performed by the control unit 102, which reads and executes a program previously stored in the ROM 104.

The control unit 102 of the central 100 starts a connection process on a central side illustrated in FIG. 7, for example, after an application for measuring a distance has started up in response to operation input by a user.

First, the advertise receiving unit 151 determines whether an Advertise of "ADV_SCAN_IND" has been received from the peripheral 200 (Step S101). The advertise receiving unit 151 waits until receiving an Advertise of "ADV_SCAN_IND" from the peripheral 200 (Step S101; No).

In the case where the advertise receiving unit 151 determines that it has received the Advertise of "ADV_SCAN_IND" from the peripheral 200 (Step S101; Yes), the scan request sending unit 152 sends a Scan_Request to the peripheral 200 after a lapse of time $T_{ifs}$ after the advertise receiving unit 151 has received the Advertise of ADV_SCAN_IND from the peripheral 200 (Step S102).

The distance measuring unit 153 determines whether it has received, from the peripheral 200, a Scan_Response to the Scan_Request sent from the scan request sending unit 152 in step S102 (Step S103). The distance measuring unit 153 waits until receiving the Scan_Response from the peripheral 200 (Step S103; No).

When the distance measuring unit 153 determines that it has received the Scan_Response from the peripheral 200 (Step S103; Yes), the distance measuring unit 153 measures a distance between the central 100 and the peripheral 200 based on the intensity of a radio wave received from the peripheral 200 (Step S104). Then, the distance measuring unit 153 displays the measured distance, for example, on the display unit 128.

Next, the advertise receiving unit 151 determines whether it has received an Advertise of "ADV_DIRECT_IND" from the peripheral 200 (Step S105). In the case where the advertise receiving unit 151 determines that it has not received the Advertise of "ADV_DIRECT_IND" from the peripheral 200 (Step S105; No), the advertise receiving unit 151 returns the process to step S101.

In the case where the advertise receiving unit 151 determines that it has received an Advertise of "ADV_DIRECT_IND" from the peripheral 200 (Step S105; Yes), the connection control unit 154 determines whether a state is suitable for connection to the peripheral 200 (Step S106). Specifically, the connection control unit 154 determines whether a state is suitable for connection to the peripheral 200 by determining whether a connection instruction such as by a user operation has been accepted or whether a state is not suitable for connection to the peripheral 200 because the central 100 performs other processes. The connection control unit 154 returns the process to step S101 in the case where the connection control unit 154 determines that a state is not suitable for connection to the peripheral 200 (Step S106; No).

The connection control unit 154 sends a Connection_Request to the peripheral 200 (Step S107) in the case where the connection control unit 154 determines that a state is suitable for connection to the peripheral 200 (Step S106; Yes). Then, the control unit 102 completes the connection process on the central side.

After the above connection process on the central side has been completed, connection between the central 100 and the peripheral 200 is established and data communication is started.

Figure 8:
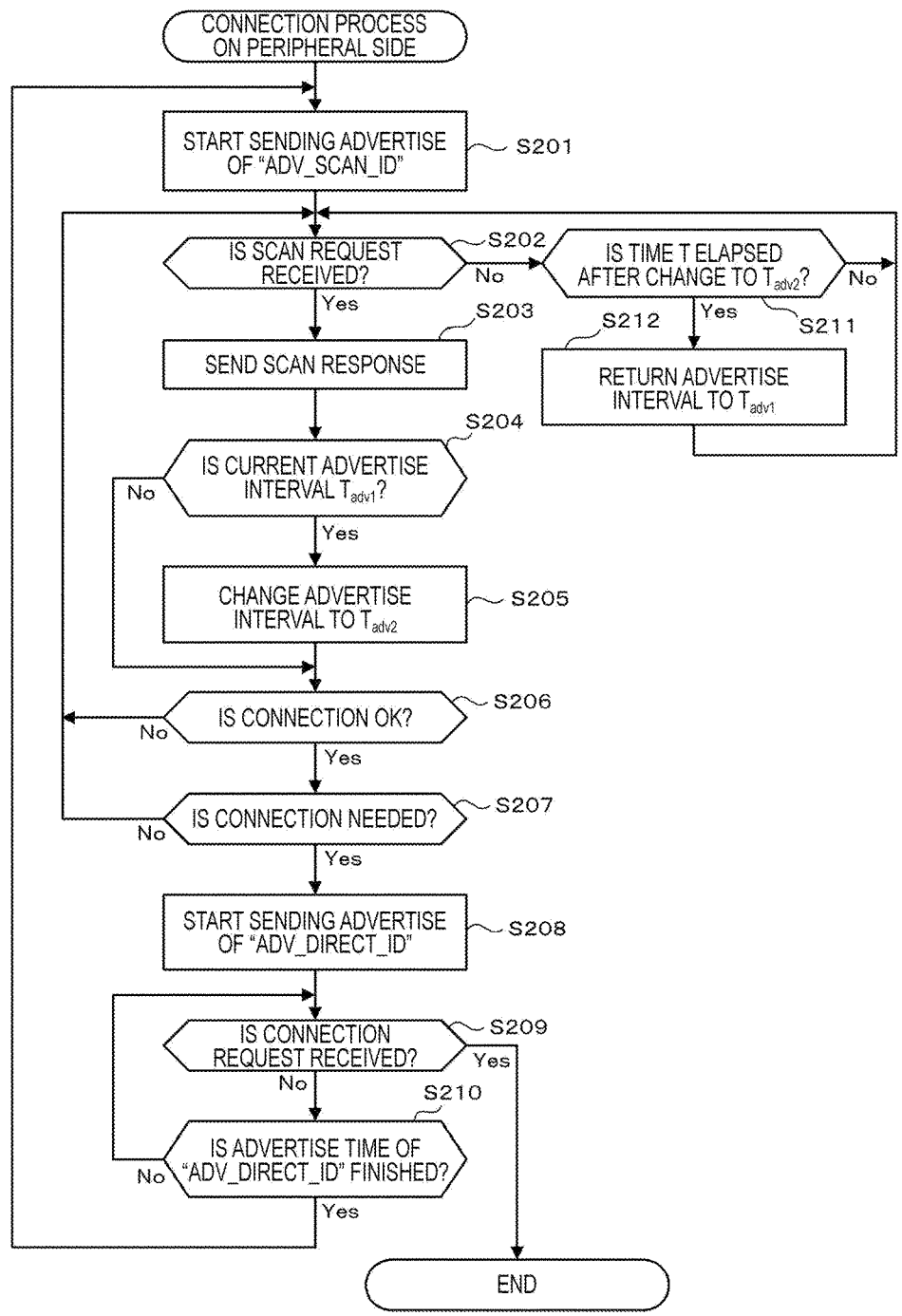
FIG. 8 is a flowchart illustrating an example of a connection process on a peripheral side, which is performed by the peripheral.

Next, an operation of the peripheral 200 according to the present embodiment will be described with reference to FIG. 8. FIG. 8 is a flowchart illustrating an example of a connection process on a peripheral side, which is performed by the control unit 202 of the peripheral 200 according to the present embodiment. This connection process on the peripheral side is performed by the control unit 202, which reads and executes a program previously stored in the ROM 204.

The control unit 202 of the peripheral 200, for example, starts the connection process on the peripheral side illustrated in FIG. 8 after power becomes on by a user operation on the operation unit 220. As an initial setting, an advertising interval is assumed to be set to the first predetermined interval $T_{adv1}$.

First, the advertise sending unit 251 starts periodically sending an Advertise of "ADV_SCAN_IND" at the first predetermined interval $T_{adv1}$. (Step S201).

Next, the scan request receiving unit 252 determines whether a Scan_Request has been received from the central 100 (Step S202).

In the case where the scan request receiving unit 252 determines that it has received a Scan_Request from the central 100 (Step S202; Yes), the response sending unit 253 sends a Scan_Response to the central 100 (Step S203).

Next, the interval changing unit 254 determines whether the present advertising interval is the first predetermined interval $T_{adv1}$ (Step S204). In the case where it is determined that the present advertising interval is not the first predetermined interval $T_{adv1}$ (Step S204; No), the interval changing unit 254 moves on to step S206.

In the case where it is determined that the present advertising interval is the first predetermined interval $T_{adv1}$ (Step S204; Yes), the interval changing unit 254 changes an advertising interval from the first predetermined interval $T_{adv1}$ to the second predetermined interval $T_{adv2}$ (Step S205).

Next, the connection request receiving unit 255 determines whether the central 100, which has sent a Scan_Request received in Step S202, is a terminal allowed to connect to the peripheral 200, for example, a management terminal of the peripheral 200 (Step S206). When the connection request receiving unit 255 determines whether the central 100 is a terminal allowed to connect to the peripheral 200, the connection request receiving unit 255, for example, may put a paired device on a white list and control the paired device on the Link Layer based on an Advertising Filter Policy, and may make the determination based on a device address of a Scanner at a time that the Scan_Request has been received.

In the case where the central 100, which has sent the Scan_Request, is determined as a terminal allowed to connect to the peripheral 200 (Step S206; Yes), the connection request receiving unit 255 determines whether it is necessary to connect to the central 100 (Step S207). Whether it is necessary to connect to the central 100 is, for example, determined based on whether there is data of which the central 100 is to be notified (such as data indicating that a remaining battery of the peripheral 200 is reduced to a baseline or lower).

In the case where it is determined that the central 100, which has sent the Scan_Request, is not a terminal allowed to connect to the peripheral 200 (Step S206; No), or it is determined that it is not necessary to connect to the central 100 (Step S207; No), the process is returned to Step S202.

In the case where it is determined that it is necessary to connect to the central 100 (Step S207; Yes), the advertise sending unit 251 starts periodically sending an Advertise of "ADV_DIRECT_IND" at the second predetermined interval $T_{adv2}$ (Step S208).

Next, the connection request receiving unit 255 determines whether it has received a Connection_Request from the central 100, which has been determined as a terminal allowed connection in step S206 (Step S209).

In the case where it is determined that the Connection_Request has not been received from the central 100 (Step S209; No), the connection request receiving unit 255 determines whether a period for sending an Advertise of "ADV_DIRECT_IND" has ended (Step S210). Specifically, the period for sending an Advertise of "ADV_DIRECT_IND" is determined to be 1.28 seconds at a maximum.

In the case where it is determined that the period for sending an Advertise of "ADV_DIRECT_IND" has not ended (Step S210; No), the connection request receiving unit 255 returns the process to step S209. Also, in the case where it is determined that the period for sending an Advertise of "ADV_DIRECT_IND" has ended (Step S210; Yes), the process is returned to step S201, and the advertise sending unit 251 returns an Advertise type to "ADV_SCAN_IND" and starts sending an Advertise.

Also, in the case where it is determined that the scan request receiving unit 252 has not received a Scan_Request from the central 100 (Step S202; No), the interval changing unit 254 determines whether a predetermined time T has passed since an advertising interval has been changed from the first predetermined interval $T_{adv1}$ to the second predetermined interval $T_{adv2}$ (Step S211). In the case where it is determined that the predetermined time T has not passed since an advertising interval has been changed (Step S211; No), the interval changing unit 254 returns the process to step S202.

In the case where it is determined that the predetermined time T has passed since an advertising interval has been changed (Step S211; Yes), the interval changing unit 254 returns the advertising interval from the second predetermined interval $T_{adv2}$ to the first predetermined interval $T_{adv1}$ (Step S212), and return the process to step S202.

Also, in the case where it is determined that the connection request receiving unit 255 has received a Connection_Request from the central 100 (Step S209; Yes), the control unit 202 completes the connection process on the peripheral side.

After the above connection process on the peripheral side has been completed, connection is established between the central 100 and the peripheral 200, and the data communication control unit 256 starts data communication.

As described above, the peripheral 200 according to the embodiment can change an advertising interval, in the case where a Scan_Request has been received from the central 100.

Also, in the case where the peripheral 200 has received a Scan_Request from the central 100, the peripheral 200 changes an advertising interval from the first predetermined interval $T_{adv1}$ to the second predetermined interval $T_{adv2}$, which is shorter than the first predetermined interval $T_{adv1}$. In response to the Connection_Request sent from the central 100, which has received an Advertise after the interval change, the peripheral 200 establishes connection to the central 100 and performs data communication. As a result, a time from receiving a Scan_Request to receiving a Connection_Request can be shortened, in comparison with the case where an Advertise is constantly sent at a predetermined interval $T_{adv}$ as illustrated in FIG. 2. Therefore, as a whole, a time to establish connection between the central 100 and the peripheral 200 can be shortened and responsiveness can be improved.

Also, the peripheral 200 returns an advertising interval to the first predetermined interval $T_{adv1}$ after a lapse of a predetermined time T after changing the advertising interval from the first predetermined interval $T_{adv1}$ to the second predetermined interval $T_{adv2}$, which is shorter than the first predetermined interval $T_{adv1}$. Therefore, power consumption can be reduced in comparison with the case where an Advertise is constantly sent at the second predetermined interval $T_{adv2}$.

Also, when a distance between the central 100 and the peripheral 200 is measured based on the intensity of a radio wave received from the peripheral 200, the peripheral 200 can provide an advertise packet for measuring the intensity of a received radio wave by shortening an advertising interval when the central 100, which will receive an Advertise, exists around the peripheral 200.

The embodiment of the present invention has been described above. However, the present invention is not limited to the above embodiment.

For example, in the above embodiment, as illustrated in FIG. 1, the radio communication system 1 includes one central 100 and one peripheral 200. However, the radio communication system 1 may include one or multiple centrals and one or multiple peripherals.

Also, in the above embodiment, although the interval changing unit 254 changes an advertising interval to either the first predetermined interval $T_{adv1}$ or the second predetermined interval $T_{adv2}$, the advertising interval changed by the interval changing unit 254 is not limited to this, and may be changed to any of various intervals.

Figure 9:
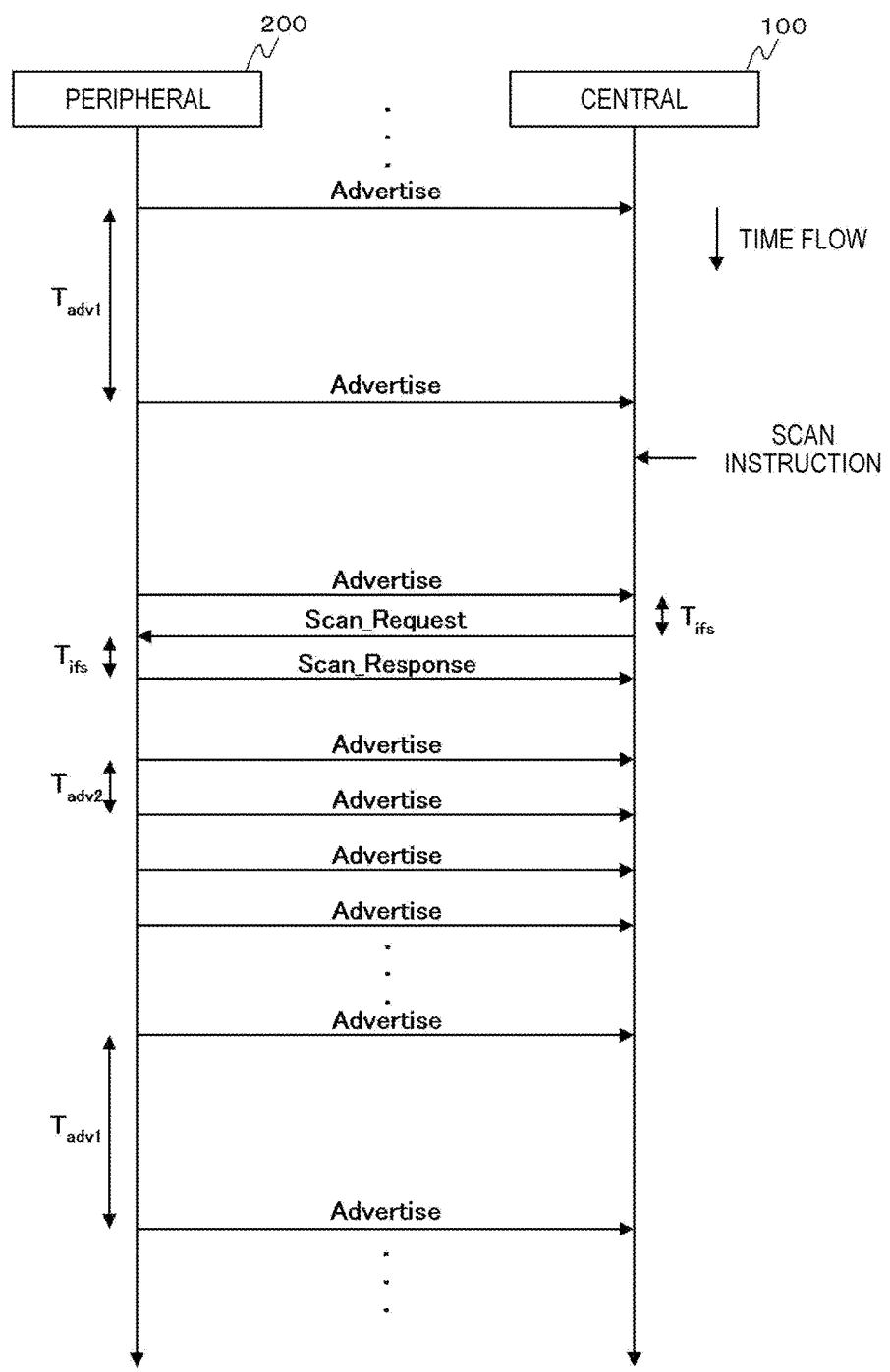
FIG. 9 is a diagram illustrating an example of a flow of advertising between the central and the peripheral according to a variation of the present invention.

Also, in the above embodiment, connection between the central 100 and the peripheral 200 is established, but the connection is not necessarily established. For example, as illustrated in FIG. 9, the peripheral 200 may just change an advertising interval. Accordingly, the central 100 can receive many Advertises, and the intensity of a received radio wave can be more precisely measured.

Also, the central 100 and the peripheral 200 according to an embodiment of the present invention can be realized by using a usual computer system without using a special device. For example, functions of the central 100 and functions of the peripheral 200 may be realized by a computer executing a program. A program for realizing the functions of the central 100 and the functions of the peripheral 200 may be stored in a computer-readable recording medium such as a universal serial bus (USB) memory, a secure digital (SD) memory card, a compact disc read only memory (CD-ROM), a digital versatile disc (DVD), a Blu-ray (registered trademark) disc (BD), and a hard disk drive (HDD), or may be downloaded onto a computer via a network.

The invention claimed is:

1. A radio communication device comprising:
 a radio communication unit configured to (i) send first identification information at a predetermined interval, (ii) receive a scan request sent from another radio communication device that has received the first identification information, and (iii) in response to receiving the scan request, send a scan response to the another radio communication device; and
 a control unit configured to change the predetermined interval to a second predetermined interval shorter than the predetermined interval, in response to the radio communication unit sending the scan response to the another radio communication device in a predetermined period,
 wherein the radio communication unit is further configured to send second identification information at the second predetermined interval when the radio communication unit determines that (i) it is necessary to connect to the another radio communication device, based on an amount of remaining battery of the radio communication device, and (ii) there exists data to be transmitted to the another radio communication device.

2. The radio communication device according to claim 1, wherein the radio communication unit is further configured to (iv) after sending the scan response, receive a connection request sent by the another radio communication device, and (v) connect to the another radio communication device and perform data communication, when the radio communication unit receives the connection request.

3. The radio communication device according to claim 1, wherein the radio communication unit determines whether it is necessary to connect to the another radio communication device when the radio communication unit receives the scan request sent by the another radio communication device, and the radio communication unit sends the second identification information, which is addressed to the another radio communication device, when the radio communication unit determines that it is necessary to connect to the another radio communication device.

4. The radio communication device according to claim 2, wherein the radio communication unit determines whether it is necessary to connect to the another radio communication device when the radio communication unit receives the scan request sent by the another radio communication device, and the radio communication unit sends the second identification information, which is addressed to the another radio communication device, when the radio communication device determines that it is necessary to connect to the another radio communication device.

5. The radio communication device according to claim 1, wherein the scan response sent to the another radio communication device includes information regarding the second predetermined interval.

6. The radio communication device according to claim 1, wherein, after a lapse of a predetermined time after changing the predetermined interval to the second predetermined interval shorter than the predetermined interval, the control unit changes the second predetermined interval back to the predetermined interval.

7. The radio communication device according to claim 2, wherein, after a lapse of a predetermined time after changing the predetermined interval to the second predetermined interval shorter than the predetermined interval, the control unit changes the second predetermined interval back to the predetermined interval.

8. The radio communication device according to claim 3, wherein, after a lapse of a predetermined time after changing the predetermined interval to the second predetermined interval shorter than the predetermined interval, the control unit changes the second predetermined interval back to the predetermined interval.

9. The radio communication device according to claim 4, wherein, after a lapse of a predetermined time after changing the predetermined interval to the second predetermined interval shorter than the predetermined interval, the control unit changes the second predetermined interval back to the predetermined interval.

10. A radio communication method performed by a radio communication device, the method comprising:
    sending first identification information at a predetermined interval;
    receiving a scan request sent by another radio communication device that has received the sent first identification information;
    in response to receiving the scan request, sending a scan response to the another radio communication device;
    changing the predetermined interval to a second predetermined interval shorter than the predetermined interval, in response to sending the scan response in a predetermined period; and
    sending second identification information at the second predetermined interval when it is determined that (i) it is necessary to connect to the another radio communication device, based on an amount of remaining battery of the radio communication device, and (ii) there exists data to be transmitted to the another radio communication device.

11. A non-transitory computer-readable recording medium storing a program which causes a computer to control a radio communication device to perform functions comprising:
    sending first identification information at a predetermined interval;
    receiving a scan request sent by another radio communication device that has received the sent first identification information;
    in response to receiving the scan request, sending a scan response to the another radio communication device;
    changing the predetermined interval to a second predetermined interval shorter than the predetermined interval, in response to sending the scan response in a predetermined period; and
    sending second identification information at the second predetermined interval when it is determined that (i) it is necessary to connect to the another radio communication device, based on an amount of remaining battery of the radio communication device, and (ii) there exists data to be transmitted to the another radio communication device.

* * * * *